United States Patent

[11] 3,540,364

[72] Inventor Shigeo Ono
 Yokohama-shi, Japan
[21] Appl. No. 700,574
[22] Filed Jan. 25, 1968
[45] Patented Nov. 17, 1970
[73] Assignee Nippon Kogaku K.K.
 Tokyo, Japan
 a corporation of Japan
[32] Priority Feb. 2, 1967
[33] Japan
[31] 42/8,728 and 42/8,729

[54] LIGHT SHIELDING DEVICE FOR A SINGLE LENS REFLEX CAMERA
 8 Claims, 6 Drawing Figs.
[52] U.S. Cl. ................................................. 95/42
[51] Int. Cl. .......................................... G03b 19/12
[50] Field of Search ................................... 95/42

[56] References Cited
UNITED STATES PATENTS
3,093,044 6/1963 Lederer ........................ 95/42
3,429,246 2/1969 Ebertz ......................... 95/42

FOREIGN PATENTS
1,208,619 1/1966 Germany ...................... 95/42

Primary Examiner—John M. Horan
Assistant Examiner—Richard M. Sheer
Attorney—Anton J. Willie ABSTRACT: A light shielding member for the viewing mirror of a single lens reflex camera is provided for blocking extraneous light rays entering the view finder during exposure of the film. A semi or partial transparent viewing mirror is provided with a supporting plate having openings through which the light rays may pass to impinge upon a photocell for an exposure measurement when the viewing mirror is in its viewing or lowered position. A light-shielding plate provided with similar openings is slidably mounted on the mirror-supporting plate, the arrangement being such that when the mirror is in its viewing position, the openings in both plates coincide to permit photometric measurements. When the mirror is raised for making an exposure, the supporting plate and shielding plate are relatively moved to cover the openings in the plates to block out the extraneous light.

LIGHT SHIELDING DEVICE FOR A SINGLE LENS REFLEX CAMERA

The present invention relates to a light-shielding device for a single lens reflex camera.

In a single lens reflex camera, an exposure meter for measuring the amount of light passing through a semi or partially transparent mirror is known. In general, the reflecting mirror of a single lens reflex camera is moved out of the light path when an exposure is made, and at the same time it performs the role of blocking the light coming in from the finder eyepiece.

However, in the reflecting mirror which is semitransparent or partially transparent, it is not always possible to perform this role, and therefore a special deice for preventing light is required. There have already been several proposals for blocking the extraneous light rays, but any of the conventional devices have d drawbacks such as the need for an independent driving device, or the amount of the movement is great, or a large space is required, or the structure is quite complicated.

The principal object of the present invention is to provide a light-shielding device of a simple structure having no such drawbacks as above mentioned.

According to one aspect of the present invention, a thin light-shielding plate is mounted on the lower side of the supporting plate of the reflecting mirror in such a manner that two plates are relatively slidable to each other. Openings are provided at corresponding portions of the supporting plate and the light-shielding plate, respectively, and the device is so arranged that, when the reflecting mirror is in its viewing or lower position, the corresponding holes in two plates are aligned. When the reflecting mirror moves to its upper position, the two plates are moved simultaneously by the movement of the reflecting mirror and relatively to each other so that one of the plates closes the openings in the other plate.

Another object of the present invention is to provide a light-shielding device of a simple structure which also absorbs the shocks produced when the mirror reaches either its upper or lower position.

According to another aspect of the invention, a thin light-shielding plate is similarly mounted on the lower side of the supporting plate of the reflecting mirror, a guide member or an eccentric bearing member provided on the camera wall will move the two plates by a predetermined amount relative to each other to close the openings in the one plate by the other plate and at the same time utilizing the reaction force of the movement of the plates to absorb the kinetic energy of the reflecting mirror.

The present invention will now be described in more detail referring to the illustrative embodiments shown in the accompanied drawing in which.

Figure 1:
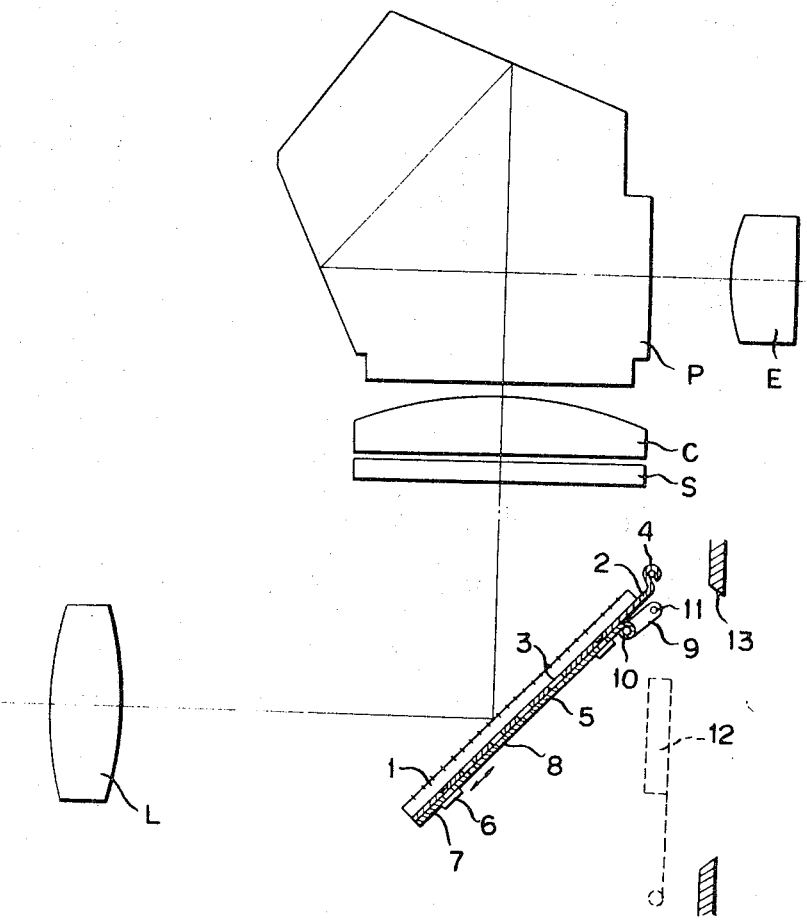
FIG. 1 is a side view of the first embodiment of the invention where the reflecting mirror is in its viewing or lower position.

In the drawing, L is a camera lens, S is a finder focusing plate, C is a condenser lens, P is a pentaprism, and E is an eyepiece.

Figure 2:
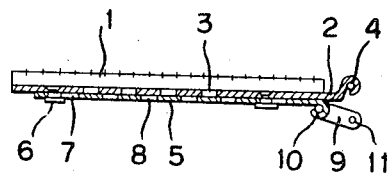
FIG. 2 is a side view showing only the portion of the reflecting mirror in FIG. 1 in its exposure or upper position.
Figure 3:
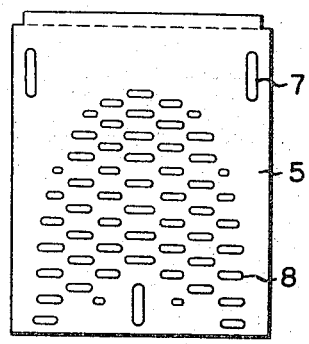
FIG. 3 is a plan view of the light-shielding plate in FIG. 1 illustrating the openings provided therein.

In the first embodiment shown in FIGS. 1 to 3, 1 is a movable reflecting mirror, the surface thereof being treated so that it is semitransparent or partially transparent, 2 is a supporting plate. The mirror-supporting plate 2 is provided with a plurality of openings 3, preferably elongated and extending transversely across the plate. The supporting plate is pivotally supported on a shaft 5 within the camera body and slidably supports on its underside, a light-shielding plate 5 as by guide pins 6 secured to the supporting plate and passing through elongated longitudinal openings 7 provided in the shielding plate. The shielding plate 5 is also provided with transverse elongated openings 8 (FIG. 3) which coincide in number and position with the openings 3 of the supporting plate when the mirror is in its viewing position as shown in FIG. 1. The shielding plate 5 has pivoted to its upper end, a lever 9, as by pin 10; the other end of the lever being mounted on a shaft 11 fixed in the camera body and offset somewhat from shaft 4 for the support plate 2. When the mirror 1 is in its viewing position as illustrated in FIG. 1, the light rays through lens L will pass through the aligned openings 3 and 8 of the two plates and impinge upon a photocell 12 positioned behind the mirror and within the frame opening 13 to provide a measure of the light intensity of the scene to be photographed. The shaft 11 may form a part of the mirror-raising mechanism in which case the lever 9 is secured to the shaft. When the mirror is moved to its upper or exposure position in the well known manner, the two plates 2 and 5 will be moved relatively in the direction of the arrow due to the offset of the shafts 4 and 11, to close the openings 3 and 8 in the plates as illustrated in FIG. 2. Thus extraneous light which may enter the eyepiece E is effectively blocked during an exposure.

As mentioned above, the holes are closed by the relative displacement of the supporting plate and light-shielding plate, this invention is not restricted to the embodiment shown in FIGS. 1 and 2, since the supporting plate can be moved relative to the shielding plate.

From the foregoing description it will be seen that any extraneous light entering the eyepiece E is blocked during exposure by a simple structure which is light in weight and so arranged that the degree and force of movement is minimized so that the impact of the mirror in moving into its raised or lowered position can be controlled. The light-shielding plate may be very thin, the openings therein in no way weakening the plate. With a very thin shielding plate the supporting shaft 4 may be positioned close to the frame opening 13. Thus the arrangement as described, does not require the enlargement of the camera body to accommodate the blocking structure described.

Figure 4:
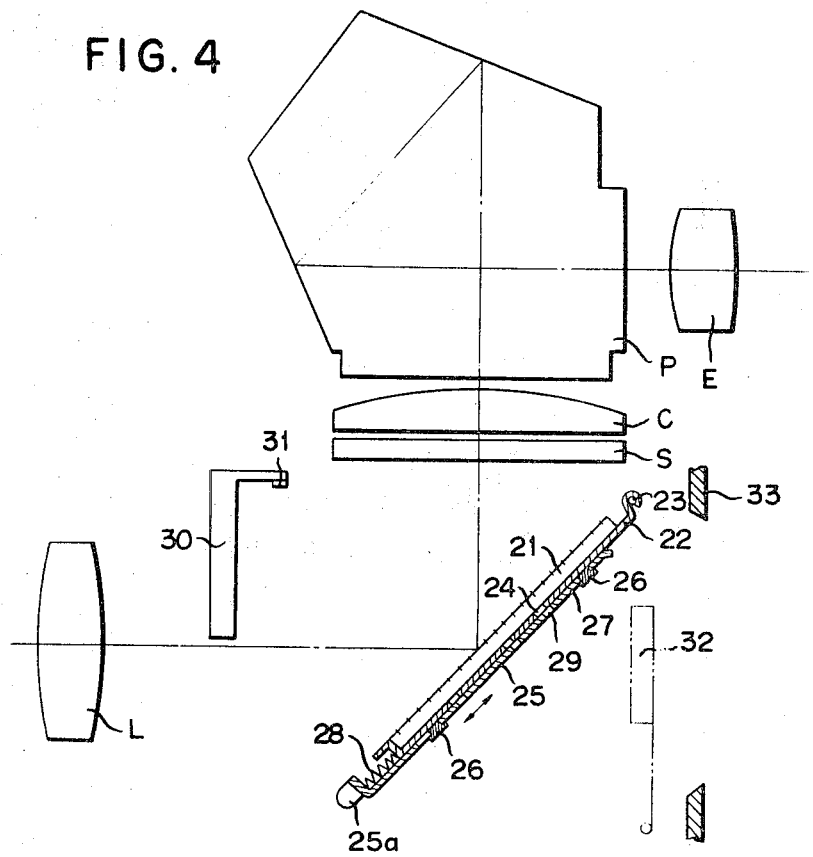
FIG. 4 is a side view of the second embodiment of the invention where the reflecting mirror is in its viewing or lower position.
Figure 5:
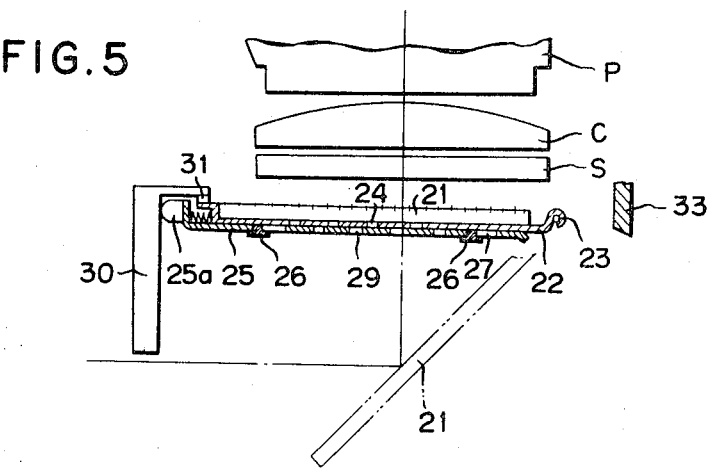
FIG. 5 is a side view showing the reflecting mirror in FIG. 4, at its light-shielding or upper position.

Now, referring to FIGS. 4 and 5, 21 is a movable reflecting mirror, of which the surface is semitransparent or partially transparent; 22 is a reflecting mirror supporting plate rotatably supported by a shaft 23. The supporting plate 23 is provided with openings 24 similar to openings 3 in plate 2, and a thin light-shielding plate 25 is supported on the underside of the plate 22 by guide pins 26 in the manner described.

Interposed between the lower ends of the plates 22 and 25 is a compression spring 28 tending to bias the plate 25 downwardly relative to the plate 22 so that the elongated openings 29 similar to openings 8, in plate 25 are aligned with the openings 24 in the supporting plate to permit the light rays to pass through the openings and impinge on a photocell 32 in the frame opening 33.

Secured within the camera body is a camming guide member 30 having a surface thereof in the path of an extension member 25a formed on the extending end of the light-shielding plate 25. As the mirror is moved toward its raised or exposure position, the extension member will engage the guide member 30 to move the plate 25 relative to the plate 22 against the bias of the spring 28. A shock-absorbing stop 32 determines the raised position of the mirror in which position the openings 24 and 29 of the respective plates are closed. Any extraneous light entering the eyepiece E is thus effectively blocked.

When the force of the spring 28, and the friction generated between the guide member 30 and the end 25a of the light-shielding plate, or the friction generated between the supporting plate 22 and the light-shielding plate 25, is appropriately selected, it is possible to absorb the kinetic energy of the reflecting mirror, and the vibration of the camera due to the force impact is minimized when shutter is released.

In the second embodiment the holes in both plates are closed by the relative displacement of the supporting plate and the light-shielding plate, and therefore without being restricted by the embodiment shown in the drawing, the supporting plate can be displaced instead of the shielding plate. On the other hand, in place of the guide member 30, a cam groove can be used.

Figure 6:
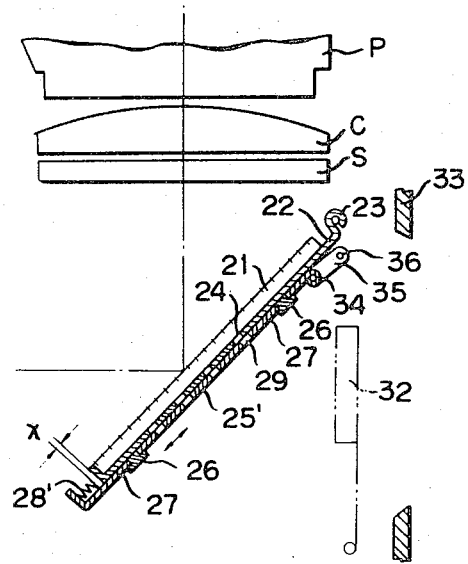
FIG. 6 is a side view of the third embodiment of the invention where the reflecting mirror is in its viewing or lower position.

In the third embodiment shown in FIG. 6, relative movement is carried out by an offset shaft arrangement as illustrated in the first embodiment. In this instance the light shielding plate 25¹ is pivotally connected by shaft 34 to a lever 35 rotatably mounted on a shaft 36 within the camera body, the shaft 36 being offset from the shaft 23 supporting the mirror-supporting plate 22. A shock absorbing spring 28' is interposed between the lower ends of the plates 22 and 25', the bias of the spring moving the plate 25' relative to the plate 22 to align the openings 24 and 29 in the respective plates when the mirror is in its lowered position as illustrated. The length of the spring 28' is so chosen that a space X will be provided between the lower edges of the two plates when the mirror is in its raised position.

The relative movement of plates 22 and 25' in aligning and blocking the openings 24 and 29 in the respective plates, is the same as that described in the first embodiment.

When the force of the spring 28', and the interval X, or the friction between the supporting plate 22 and the light shielding plate 25' are appropriately selected, the raising kinetic energy of the reflecting mirror can be absorbed.

It is therefore apparent that a mirror arrangement for a single reflex camera is provided whereby any extraneous light entering the eyepiece during an exposure period is effectively blocked by the relative movement of the mirror-supporting plate and the light-shielding plate slidably mounted thereon. The shock of impact of the mirror in raising the mirror is also minimized by an extremely simple structure, the added weight of the light-shielding plate adding very little to the mirror and its supporting plate.

I CLAIM:

1. In a single lens reflex camera provided with a photosensitive element for measuring the intensity of the light rays passing through the camera lens and a semitransparent viewing mirror pivotable between a viewing position and a raised position, the combination comprising:

a mirror-supporting plate for the mirror and pivotable between the viewing position and the raised position;

a light-shielding plate slidably supported on the underside of the supporting plate and pivotable therewith, both of said plates being formed with a plurality of similar openings which are aligned when the supporting plate is in its viewing position to permit the light rays to pass through the openings and impinge on the photosensitive element; and means for sliding said plates relative to each other when the supporting plate is moved from the viewing position to the raised position to close the openings when the supporting plate is in its raised position.

2. The combination as set forth in claim 1, wherein the sliding means includes a camming guide member in the path of one of the plates to slide the one plate relative to the other as the plates are pivoted toward the raised position.

3. The combination as set forth in claim 2, wherein said camming guide member is provided with a shock-absorbing stop in the raised position of the plates.

4. The combination as set forth in claim 3, wherein a spring extends the supporting plate and shielding plate when the plates are in the viewing position to align the openings therein, an extension on the shielding plate engaging the camming guide means to move the shielding plate relative to the supporting plate.

5. The combination as set forth in claim 1, wherein the sliding means includes a lever pivoted at one end to one of the plates, and a shaft supporting the other end of the lever and offset from the pivotal axis of the other plate to slide the one plate relative to the other plate when the supporting plate is pivoted to the raised position.

6. The combination as set forth in claim 1, wherein the sliding means includes a lever pivoted at one end to the shielding plate, a first shaft pivotally supporting the mirror supporting plate, and a second shaft supporting the other end of the lever and offset from said first shaft to slide the one shielding plate relative to the supporting plate when the supporting plate is pivoted to the raised position.

7. The combination as set forth in claim 6, wherein the lever is secured to the second shaft, the second shaft forming a part of the mirror-raising mechanism of the camera.

8. The combination as set forth in claim 6, wherein a spring is interposed between the two plates for extending the plates to align the openings when the mirror is in the viewing position.